(12) United States Patent
Eriksson Normand

(10) Patent No.: US 11,437,827 B2
(45) Date of Patent: Sep. 6, 2022

(54) CONTROL OF A RELATIVELY LOW CURRENT FED TO A BATTERY PACK

(71) Applicant: VOLVO TRUCK CORPORATION, Gothenburg (SE)

(72) Inventor: Lars Eriksson Normand, Gothenburg (SE)

(73) Assignee: VOLVO TRUCK CORPORATION, Gothenburg (SE)

(*) Notice: Subject to any disclaimer, the term of this patent is extended or adjusted under 35 U.S.C. 154(b) by 0 days.

(21) Appl. No.: 16/080,558

(22) PCT Filed: Mar. 1, 2016

(86) PCT No.: PCT/EP2016/052609
§ 371 (c)(1),
(2) Date: Aug. 28, 2018

(87) PCT Pub. No.: WO2017/148496
PCT Pub. Date: Sep. 8, 2017

(65) Prior Publication Data
US 2019/0089167 A1  Mar. 21, 2019

(51) Int. Cl.
*H02J 7/00* (2006.01)
*B60L 58/20* (2019.01)
*B60L 9/00* (2019.01)

(52) U.S. Cl.
CPC ............ *H02J 7/0014* (2013.01); *B60L 58/20* (2019.02); *H02J 7/007* (2013.01); *H02J 7/0016* (2013.01);
(Continued)

(58) Field of Classification Search
CPC ...... H02J 7/0014; H02J 7/0047; H02J 7/0016; H02J 7/0021; B60L 58/20
(Continued)

(56) References Cited

U.S. PATENT DOCUMENTS 5,557,189 A * 9/1996 Suzuki .................. H02J 7/0016
320/119
5,818,201 A * 10/1998 Stockstad ............. H02J 7/0016
320/119
(Continued)

FOREIGN PATENT DOCUMENTS

CN    102778651 A    11/2012
CN    102906961 A    1/2013
(Continued)

OTHER PUBLICATIONS

International Search Report dated Jul. 5, 2017) for corresponding International App. PCT/EP2016/052609.
(Continued)

*Primary Examiner* — John T Trischler
(74) *Attorney, Agent, or Firm* — Venable LLP; Jeffri A. Kaminski

(57) ABSTRACT

A method for controlling a current being fed to a battery pack including a plurality of battery cells connected in series and providing an output battery voltage includes the steps of: feeding a relatively low current through a resistor being arranged in series with the battery pack; and measuring the voltage across the resistor, thereby obtaining a value of the current. A system for controlling a current being fed to a battery pack is also provided.

13 Claims, 3 Drawing Sheets

(52) U.S. Cl.
CPC .......... *H02J 7/0021* (2013.01); *H02J 7/0047* (2013.01); *B60L 9/00* (2013.01); *B60L 2200/18* (2013.01); *H02J 7/0048* (2020.01)

(58) Field of Classification Search
USPC ...................................................... 320/118
See application file for complete search history.

(56) References Cited

U.S. PATENT DOCUMENTS

| | | | | | |
|---|---|---|---|---|---|
| 5,952,815 | A * | 9/1999 | Rouillard | .............. | H02J 7/0016 320/116 |
| 6,037,750 | A * | 3/2000 | Von Novak | ........... | H02J 7/0036 320/132 |
| 7,081,737 | B2 * | 7/2006 | Liu | .................... | H01M 10/441 320/130 |
| 7,142,019 | B2 * | 11/2006 | Mair | ................... | H03K 17/164 326/96 |
| 7,463,009 | B2 * | 12/2008 | Chang | .............. | H01M 10/4207 320/118 |
| 7,615,966 | B2 * | 11/2009 | Houldsworth | ........ | H02J 7/0016 320/118 |
| 7,633,314 | B2 * | 12/2009 | Mair | ................... | H03K 17/164 326/33 |
| 7,777,451 | B2 * | 8/2010 | Chang | .................. | H02J 7/0016 320/118 |
| 7,782,013 | B2 * | 8/2010 | Chang | .................. | H02J 7/0016 320/116 |
| 7,808,207 | B1 * | 10/2010 | Chang | ................ | H01M 10/441 320/117 |
| 7,825,632 | B1 * | 11/2010 | Chang | .................. | H02J 7/0016 320/135 |
| 8,044,640 | B2 * | 10/2011 | Cruise | .................... | H02J 7/022 320/137 |
| 8,058,842 | B2 * | 11/2011 | Kai | ..................... | H01M 2/1077 320/116 |
| 8,103,401 | B2 * | 1/2012 | Kubo | ..................... | B60L 50/64 701/34.1 |
| 8,154,248 | B2 * | 4/2012 | Cruise | ................ | H01M 10/441 320/112 |
| 8,159,184 | B2 * | 4/2012 | Emori | .................. | B60L 3/0046 320/116 |
| 8,159,191 | B2 * | 4/2012 | Chang | .................. | H02J 7/0026 320/136 |
| 8,207,704 | B2 * | 6/2012 | Kai | ..................... | H01M 2/1077 320/116 |
| 8,212,571 | B2 * | 7/2012 | Emori | .................. | B60L 58/21 324/522 |
| 8,242,745 | B2 * | 8/2012 | Zhang | .................... | B60L 58/22 320/119 |
| 8,264,204 | B2 * | 9/2012 | Nagaoka | .............. | H02J 7/0016 320/136 |
| 8,638,070 | B2 * | 1/2014 | Maluf | .................... | G01R 31/36 320/141 |
| 8,901,890 | B2 * | 12/2014 | Yamauchi | ............... | H02J 3/382 320/128 |
| 9,035,611 | B2 * | 5/2015 | Kikuchi | .................. | B60L 11/18 320/116 |
| 9,037,426 | B2 * | 5/2015 | Schaefer | .................. | H02J 7/04 702/63 |
| 9,102,313 | B2 * | 8/2015 | Bissontz | ........... | B60W 50/0205 |
| 9,121,910 | B2 * | 9/2015 | Maluf | ................... | H02J 7/0086 |
| 9,217,765 | B2 * | 12/2015 | Lazar, II | ................ | G01R 31/50 |
| 9,236,753 | B2 * | 1/2016 | Sekino | ................. | B60L 3/0046 |
| 9,300,016 | B2 * | 3/2016 | Yun | .................... | H01M 10/482 |
| 9,531,046 | B2 * | 12/2016 | Inoue | ................ | H01M 10/6566 |
| 9,608,458 | B2 * | 3/2017 | Maltsev | ............... | H02J 7/0013 |
| 9,711,962 | B2 * | 7/2017 | Andrea | ................ | H02H 9/002 |
| 9,925,878 | B2 * | 3/2018 | Hashim | .................. | B60L 50/50 |
| 9,925,933 | B2 * | 3/2018 | Hartl | .................... | B60R 16/02 |
| 9,952,568 | B2 * | 4/2018 | Livadaras | .............. | G06Q 10/00 |
| 10,048,322 | B2 * | 8/2018 | Seo | ...................... | G01R 31/382 |
| 10,348,101 | B2 * | 7/2019 | Li | ......................... | H01M 10/42 |
| 10,355,496 | B1 * | 7/2019 | Furman | ................. | H02J 7/0024 |
| 10,396,570 | B2 * | 8/2019 | Loncarevic | ........... | H02J 7/0016 |
| 10,444,295 | B2 * | 10/2019 | Wen | ........................ | H02J 7/005 |
| 10,714,947 | B2 * | 7/2020 | Li | .......................... | H02J 7/0071 |
| 10,720,672 | B2 * | 7/2020 | Qin | ......................... | H02J 7/007 |
| 11,133,682 | B2 * | 9/2021 | Xu | ......................... | H02J 7/0016 |
| 11,303,137 | B2 * | 4/2022 | Li | .......................... | H02J 7/007 |
| 2005/0024015 | A1 * | 2/2005 | Houldsworth | ........ | H02J 7/0016 320/119 |
| 2006/0017444 | A1 | 1/2006 | Fechalos et al. | | |
| 2006/0049849 | A1 * | 3/2006 | Mair | .................... | H03K 17/164 326/95 |
| 2007/0103202 | A1 * | 5/2007 | Mair | .................... | H03K 17/164 326/96 |
| 2008/0007891 | A1 * | 1/2008 | Doljack | ................ | H01G 4/255 361/502 |
| 2008/0012529 | A1 * | 1/2008 | Chang | ............... | H01M 10/4207 320/116 |
| 2008/0050645 | A1 * | 2/2008 | Kai | ...................... | H01M 2/1077 429/61 |
| 2008/0284333 | A1 | 11/2008 | Aas et al. | | |
| 2008/0284375 | A1 * | 11/2008 | Nagaoka | ............... | H02J 7/0016 320/116 |
| 2009/0066291 | A1 * | 3/2009 | Tien | ..................... | H02J 7/0069 320/118 |
| 2009/0079391 | A1 * | 3/2009 | Lupu | .................... | H02J 7/0016 320/122 |
| 2009/0085516 | A1 * | 4/2009 | Emori | .................. | B60L 3/0046 320/118 |
| 2009/0096420 | A1 * | 4/2009 | Lupu | .................... | H02J 7/0016 320/122 |
| 2009/0195213 | A1 * | 8/2009 | Li | ......................... | H02J 7/0016 320/136 |
| 2010/0085012 | A1 * | 4/2010 | Cruise | ................. | H01M 10/441 320/134 |
| 2010/0085021 | A1 * | 4/2010 | Cruise | .................... | H02J 7/022 320/162 |
| 2010/0253278 | A1 * | 10/2010 | Chang | .................. | H02J 7/0026 320/101 |
| 2010/0253285 | A1 * | 10/2010 | Takahashi | ............. | H02J 7/0016 320/118 |
| 2011/0089897 | A1 * | 4/2011 | Zhang | ................... | H02J 7/0026 320/116 |
| 2011/0140665 | A1 * | 6/2011 | Tamezane | ............. | H02J 7/0016 320/118 |
| 2011/0193525 | A1 * | 8/2011 | Ro | ........................ | H02J 7/0016 320/116 |
| 2011/0279085 | A1 * | 11/2011 | Shigemizu | ............ | H02J 7/0016 320/117 |
| 2011/0285356 | A1 * | 11/2011 | Maluf | ....................... | H02J 7/00 320/139 |
| 2011/0316483 | A1 * | 12/2011 | Zhang | .................. | H01M 10/486 320/118 |
| 2012/0025769 | A1 * | 2/2012 | Kikuchi | ............... | B60L 11/1853 320/118 |
| 2012/0052345 | A1 * | 3/2012 | Kai | ...................... | H01M 2/1077 429/61 |
| 2012/0141848 | A1 * | 6/2012 | Nagaoka | .............. | H02J 7/0016 429/92 |
| 2012/0256568 | A1 * | 10/2012 | Lee | ........................ | H02J 7/1423 318/139 |
| 2012/0290234 | A1 * | 11/2012 | Schaefer | ............. | H02J 7/00716 702/63 |
| 2012/0319658 | A1 | 12/2012 | White et al. | | |
| 2013/0057210 | A1 * | 3/2013 | Nergaard | ................ | B60L 53/64 320/109 |
| 2013/0241471 | A1 * | 9/2013 | Arai | ........................ | H02J 7/007 320/107 |
| 2013/0244065 | A1 * | 9/2013 | Yamauchi | ............... | H02J 7/0014 429/61 |
| 2014/0009106 | A1 * | 1/2014 | Andrea | ................. | H02H 9/002 320/107 |
| 2014/0021959 | A1 * | 1/2014 | Maluf | .................. | H02J 7/00711 324/430 |
| 2014/0046534 | A1 * | 2/2014 | Lazar, II | ................ | B60L 3/04 701/33.9 |

(56) References Cited

U.S. PATENT DOCUMENTS

| | | | |
|---|---|---|---|
| 2014/0062408 A1* | 3/2014 | Sekino | B60L 3/0046 320/118 |
| 2014/0077731 A1* | 3/2014 | Kuwano | B60L 58/13 318/139 |
| 2014/0079960 A1* | 3/2014 | Yun | H01M 10/482 429/7 |
| 2014/0176080 A1 | 6/2014 | Chung et al. | |
| 2014/0236366 A1* | 8/2014 | Livadaras | G06Q 10/00 700/286 |
| 2014/0239901 A1* | 8/2014 | De Cock | H02J 7/0019 320/119 |
| 2014/0306662 A1* | 10/2014 | Kim | H02J 7/007 320/118 |
| 2014/0306666 A1* | 10/2014 | Choi | H02J 7/0016 320/134 |
| 2014/0340023 A1* | 11/2014 | Shu | H02J 7/0018 320/107 |
| 2015/0061376 A1* | 3/2015 | Hartl | B60R 16/02 307/9.1 |
| 2015/0084404 A1* | 3/2015 | Hashim | B60L 50/50 307/9.1 |
| 2015/0200559 A1* | 7/2015 | Im | H02J 7/0026 307/18 |
| 2015/0255838 A1* | 9/2015 | Inoue | H01M 10/625 429/62 |
| 2015/0372539 A1* | 12/2015 | Livadaras | G05B 15/02 700/297 |
| 2016/0020629 A1* | 1/2016 | Lee | H01M 10/482 320/164 |
| 2016/0056655 A1* | 2/2016 | Kaneda | H02J 7/0016 320/136 |
| 2016/0118819 A1* | 4/2016 | Chatroux | B60L 3/0046 320/112 |
| 2016/0190829 A1* | 6/2016 | Mei | H02J 7/0016 320/112 |
| 2016/0241052 A1* | 8/2016 | Yang | H02J 7/0021 |
| 2016/0276848 A1* | 9/2016 | Maltsev | H02J 7/0047 |
| 2016/0336624 A1* | 11/2016 | Gu | H01M 10/06 |
| 2017/0003353 A1* | 1/2017 | Seo | G01R 35/04 |
| 2017/0005487 A1* | 1/2017 | De Cock | H02J 7/0019 |
| 2017/0199250 A1* | 7/2017 | Yoon | G01R 31/3828 |
| 2017/0271863 A1* | 9/2017 | Andrea | H02H 9/002 |
| 2017/0271864 A1* | 9/2017 | Andrea | H02H 9/002 |
| 2017/0271865 A1* | 9/2017 | Andrea | H02H 9/002 |
| 2018/0262023 A1* | 9/2018 | Li | H01M 10/425 |
| 2018/0309171 A1* | 10/2018 | Qin | H01M 10/425 |
| 2018/0316207 A1* | 11/2018 | Irish | H02J 7/007192 |
| 2019/0016232 A1* | 1/2019 | Kim | B60L 7/10 |
| 2019/0074556 A1* | 3/2019 | Onoda | H01M 10/4207 |
| 2019/0089147 A1* | 3/2019 | Okabe | H02J 7/0029 |
| 2019/0207395 A1* | 7/2019 | Snyder | H02J 7/0016 |
| 2019/0280491 A1* | 9/2019 | Li | H02J 7/0013 |
| 2020/0076207 A1* | 3/2020 | Xu | H02J 7/0016 |
| 2020/0328601 A1* | 10/2020 | Li | H01M 10/42 |

FOREIGN PATENT DOCUMENTS

| | | | |
|---|---|---|---|
| DE | 19533542 A1 * | 3/1996 | H02J 7/0018 |
| DE | 102012000653 A1 * | 11/2012 | H01M 10/441 |
| KR | 20130071950 A | 7/2013 | |
| WO | 9215142 A1 | 9/1992 | |

OTHER PUBLICATIONS

European Office Action dated Oct. 1, 2019 in corresponding EP Application No. 16703536.9, 6 pages.
European Office Action dated Jul. 29, 2020 in corresponding European Application No. 16703536.9, 6 pages.
China Office Action dated Jul. 26, 2021 in corresponding China Patent Application No. 201680082967.6, 15 pages.

* cited by examiner

CONTROL OF A RELATIVELY LOW CURRENT FED TO A BATTERY PACK

BACKGROUND AND SUMMARY

The invention relates to a method for controlling a current being fed to a battery pack comprising a plurality of battery cells connected in series and providing an output battery voltage.

The invention also relates to a system for controlling a current being fed to a battery pack comprising a plurality of battery cells connected in series and providing an output battery voltage.

The invention is applicable to vehicles which are operated by means of at least an electric machine. In this disclosure, the invention will be described with respect to a vehicle in the form of a bus. However, the invention is not restricted to this particular vehicle, but may also be used in other vehicles such as heavy-duty vehicles, trucks, cars, trams and construction equipment. The invention is not limited to being used in connection with battery packs for vehicles, but can also be used for battery packs being used, for example, in solar cell arrangements and so-called "smart grid" electric utility networks for managing electricity demand in society.

In the field of vehicles, there is a steady development related to propulsion of vehicles with alternative power sources, i.e. power sources being used as alternatives to conventional internal combustion engines. In particular, electrically operated vehicles have emerged as a promising alternative.

According to today's technology, a vehicle can be operated by means of an electric machine solely or by means of an arrangement comprising both an electric machine and an internal combustion engine. The latter alternative is often referred to as a hybrid vehicle (HEV), and can for example be utilized in a manner in which an internal combustion engine is used for operating the vehicle while driving outside urban areas whereas the electric machine can be used in urban areas or in environments in which there is a need to limit the discharge of harmful pollutants such as for example carbon monoxide and oxides of nitrogen.

The technology involved in electrically operated vehicles is closely related to the development of electrical energy storage systems, such as battery-related technology for vehicles. Today's electrical energy storage systems for vehicles may comprise a battery pack with a plurality of rechargeable battery cells which, together with control circuits, form a system which is configured for providing electric power to an electric machine in a vehicle.

A vehicle which is operated by means of an electric machine is normally supplied with power from a rechargeable electrical energy storage system, i.e. a battery pack with rechargeable battery cells which can be charged by means of an external electric power supply. This is carried out after the energy storage system and the external power supply have been electrically connected by means of suitable connector elements.

In the automotive field, an energy storage system normally comprises a battery pack with a large number of battery cells. A battery pack may for example be of the lithium-ion type. In the event that a 600 V lithium-ion battery pack is used, for example approximately 200 battery cells connected in series will then be needed to achieve a desired voltage in order to operate the vehicle. The available range for driving the vehicle depends on certain parameters such as the state of charge (SOC) of the battery pack.

The state of charge is an important parameter to use in order to prevent batteries from being operated during under- or over-charging situations, and to manage the energy in electric vehicles. Furthermore, it is known that batteries degrade over time and that the expected driving range and the fuel savings of a vehicle cannot be upheld towards the end of the lifetime of a battery, due to decreasing performance of the battery. Also, the decreasing performance will affect the magnitude of the power which can be received and supplied by the battery.

It is previously known that requirements for optimum battery properties can be reached by means of a process referred to as battery cell equalization, or cell balancing. The reason for this is that the voltages of different battery cells in a battery pack will differ between cells during the course of time. This lack of balance between cells may result in degraded battery properties. There is consequently a need to equalize the state of charge for the battery cells. In this manner, it will be possible to obtain optimum properties of the battery pack.

According to known technology, there exist many different methods for cell balancing. One such known method is to discharge one or more battery cells having a cell voltage or state of charge (SOC) which differs considerably from the remaining battery cells, through a resistor which is coupled in parallel with each battery cell.

The patent document US 2014/306666 teaches a system for battery balancing, in particular for implementing balancing between batteries which are connected in parallel by controlling a power relay assembly. Also, the balancing process can be implemented by means of a control of a suitable value of a pre-charge resistor.

Even though there exist several methods and systems for battery cell balancing, there is still a need for improvements within this field, in particular for implementing cell balancing without an unnecessary loss of charge from the battery pack. In particular, it has been noted that during a cell balancing process, it is of high importance to be able to control a current which is fed to the battery pack in a very accurate manner. In this manner, the properties of the battery pack can be optimized.

It is desirable to provide a method and system for controlling a current which is fed to a battery pack, which particularly but not exclusively can be used during cell balancing of a battery pack, and in which problems relating to unwanted cell voltage drop and reduced power delivery capacity for the battery pack can be overcome.

According to a first aspect, a method is provided for controlling a current being fed to a battery pack comprising a plurality of battery cells connected in series and providing an output battery voltage. Furthermore, the method comprises the steps of: feeding a relatively low current through a resistor being arranged in series with said battery pack; and measuring the voltage across said resistor, thereby obtaining a value of said current.

An advantage of the invention is that it can be used for controlling said current, in particular during cell balancing of a battery pack which is carried out in a manner in which a battery cell voltage drop can be reduced during the cell balancing. Also, the power delivery capacity for the battery pack can be optimized as a result of the battery cell balancing using a current control according to the invention.

According to an embodiment, the current is fed during a phase when the charge and discharge ability of the battery pack is below a predetermined limit. This means that when the charge and discharge ability of the battery pack is sufficiently high, the accurate current control as mentioned above is no longer needed. Also, this means that a battery pack having a relatively low temperature, for example, can be fed with said current until it reaches a condition in which it can be charged in a regular manner.

Furthermore, and according to an embodiment, the above-mentioned relatively low current can be fed to said battery pack during a process of battery cell balancing. In this manner, the above-mentioned goal of optimizing the power delivery properties of the battery pack can be obtained.

According to an embodiment, the magnitude of the current is controlled so as to compensate for a loss of electric charge in said battery cells during said cell balancing. This results in an efficient cell balancing process in which the loss of charge can be minimized.

According to a further embodiment, said current is fed through a resistor forming part of the battery pack. The resistor may be adapted for limiting an inrush current when said battery pack is connected to said charging unit. By feeding the current through the resistor, an accurate control of the magnitude of the current can be obtained.

According to a second aspect, a system is provided for controlling a current being fed to a battery pack comprising a plurality of battery cells connected in series and providing an output battery voltage. Furthermore, said system comprises a control unit which is adapted for feeding a relatively low current through a resistor, which is arranged in series with said battery pack, and for measuring the voltage across said resistor, thereby obtaining a value of said current.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

DETAILED DESCRIPTION

Different aspects of the present disclosure will be described more fully hereinafter with reference to the enclosed drawings. The method and system disclosed herein can, however, be realized in many different forms and should not be construed as being limited to the aspects set forth below.

The invention will now be described with reference to an embodiment and the enclosed drawings. With initial reference to FIG. 1, there is shown a simplified perspective view of a vehicle in the form of a bus 1 which according to the embodiment is of the electric type and is equipped with an electric machine 2 which can be used for operating the bus 1. This is shown schematically in FIG. 1 by means of a rear axle 3 which is connected to the electric machine 2.

Figure 1:
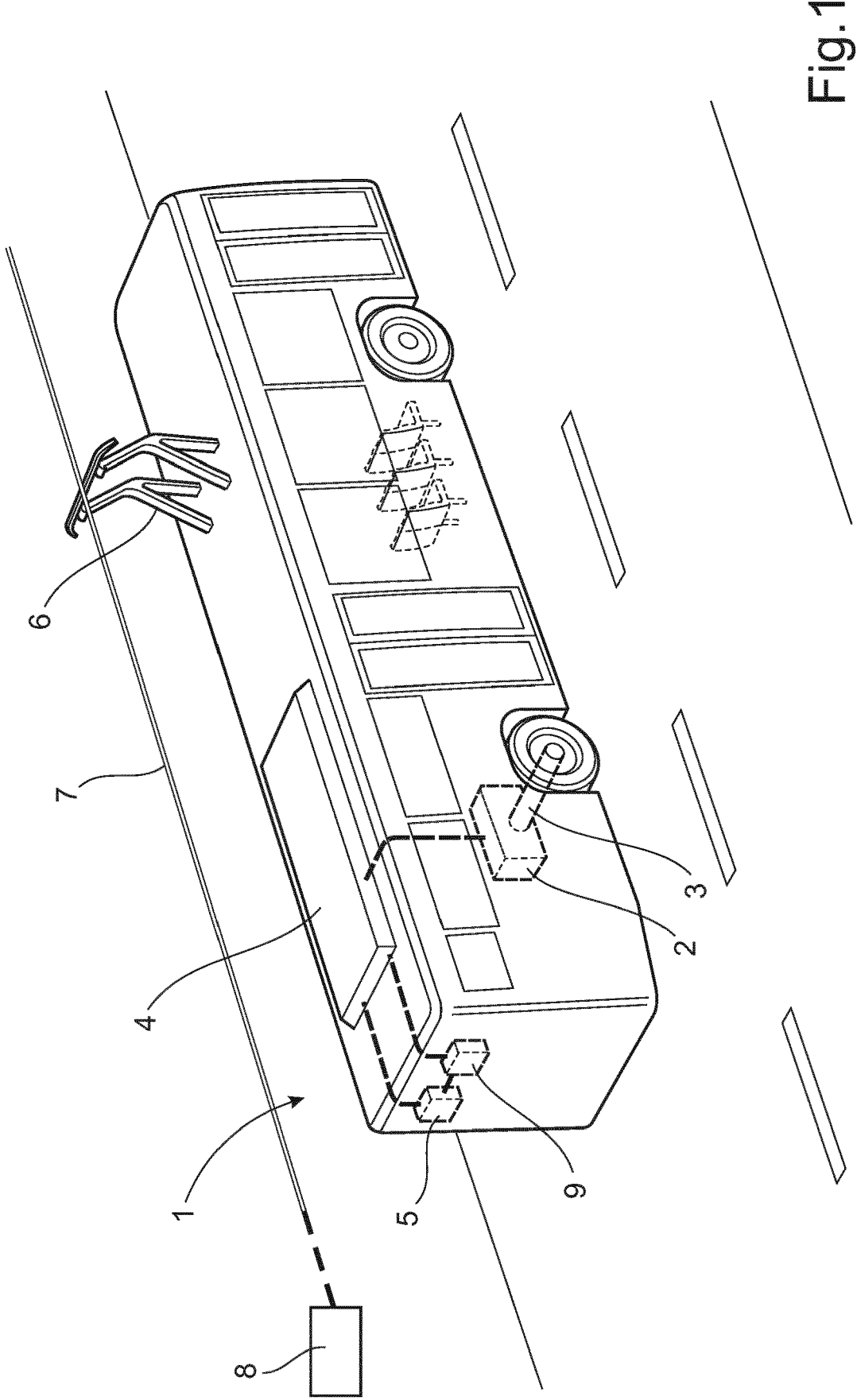
FIG. 1 shows a simplified perspective view of a vehicle in which the present invention can be implemented.

The bus 1 carries an electric energy storage system in the form of a battery pack 4 which in turn comprises a plurality of battery cells (not shown in detail in FIG. 1). As will be described in greater detail below, the battery cells are connected in series to provide an output DC voltage. Suitably, the battery cells are of lithium iron phosphate (LiFePO4) type, but other types may also be used.

The battery pack 4 is also connected to an electronic control unit 5 which is arranged for measuring one or more predetermined parameters which are indicative of the state of operation of the battery pack 4. For example, the control unit 5 can be configured for measuring the voltage of the battery pack 4 and its battery cells, or one or more alternative parameters such as the battery current or the temperature of each battery cell. Such parameters can be used for controlling the condition and operation of the battery pack 4. The battery pack 4 will be described in greater detail below with reference to FIG. 2.

According to the embodiment, the battery pack 4 is arranged on the roof of the bus 1, as indicated in FIG. 1, but other arrangements of the battery pack 4 are also possible within the scope of the invention.

Other components of the propulsion system of the bus 1, which are not shown here in detail, are also connected to the control unit 5. Even though the invention is described with reference to a vehicle in the form of a bus, it can be used for virtually any type of vehicle which is operated by means of at least an electric machine and which has an energy storage system comprising a battery pack with a number of battery cells.

During operation of the bus 1, the energy storage system 4 will deliver the required power to the electric machine 2, which in turn is driving the rear axle 3. The manner in which an electric machine can be used for operating a vehicle is generally previously known and for this reason, it is not described in detail here.

The bus 1 is equipped with a first electric connector element 6, suitably in the form of a pantograph which is mounted on the roof of the bus 1. The first connector element 6 is arranged for being connected to a second electric connector element 7 in the form of an overhead electrical conductor wire which is configured for conducting a charging current having a certain voltage. The overhead conductor 7 forms part of an external power supply 8, suitably in the form of an AC grid system. In this manner, the battery pack 4 can be supplied with an electrical current by means of the connection between the overhead wire 7 and the pantograph 6. More precisely, the electric current is fed to an on-board charging unit 9 which is connected to the battery pack 4 for charging thereof. The charging unit 9 is also connected to the control unit 5.

According to the embodiment, the pantograph 6 and the overhead wire 7 are arranged so that charging of the battery pack 4 takes place while the bus 1 is standing still, i.e. either at a charging station at a bus terminal or at a bus stop or a similar position. Alternatively, charging of the battery pack 4 can be carried out during operation of the bus 1.

According to the embodiment shown in FIG. 1, the vehicle 1 is arranged to be operated by means of the electric machine 2 only. According to a further embodiment (which is not shown in the drawings), the vehicle may be a hybrid vehicle, for example a so-called plug-in hybrid vehicle which is equipped with an internal combustion engine and an electric machine which are connected to each other via a clutch. Both the internal combustion engine and the electrical machine can then be used alternately or in parallel to operate the vehicle. As mentioned, the arrangement for charging can also be of the plug-in type comprising a charging cable connecting the battery in the vehicle to a charging station.

In the shown example, a process for charging the battery pack 4 can be initiated when the bus approaches the overhead wire 7 so that the pantograph 6 and the wire 7 can come into contact with each other. This means that charging of the battery pack 4 is initialed upon connection of the battery pack 4 to the external power supply 8. Regarding the second connector element 7, it can be noted that it can be arranged as an overhead wire, as shown in FIG. 1. Alternatively, the invention can be implemented with a second connector element in the form of a current conducting power rail which is arranged along the road surface. Such an arrangement is configured to cooperate with one or more current collectors which are movable and lowered towards the ground, and which may be configured to be connected with said current conducting power rail during operation of the vehicle. The invention can also be implemented by means of other types of conductors, for example current wires arranged along the side of a vehicle and corresponding with suitable current collectors or the vehicle.

An embodiment of the invention will now be described in greater detail with reference to FIG. 2, which is a schematic figure showing the battery pack 4, the control unit 5, the on-board charging unit 9 and certain other associated components of the vehicle 1.

According to an embodiment, the battery pack 4 comprises a plurality of battery cells, symbolically represented by three battery cells 4a, 4b, 4c, which are connected in series and which provide an output battery voltage (VB). The battery pack 4 contains a large number of battery cells, suitably in the magnitude of 200 cells, although the specific number may vary. According to the embodiment, the battery cells 4a, 4b, 4c are of the lithium iron phosphate (LiFePO4) type, although the principles of the invention are equally applicable to other types of battery cells. Also, although the embodiment comprises one battery pack, it should be noted that the invention is applicable in cases where several battery packs are combined.

As mentioned above with reference to FIG. 1, the battery pack 4 is connected to an electric machine (not shown in FIG. 2) and is configured for operating said electric machine, which in turn operates the vehicle in question. Furthermore, the battery pack 4 is connected to the on-board charging unit 9 so as to allow charging of the battery pack 4 when the charging unit 9 is connected to the external power supply 8. The external power supply 8 is typically configured for supplying a 400 V AC three-phase voltage. Also, the charging unit 9 is connected to the battery pack 4 via a positive main contactor 10 and a negative main contactor 11. The charging unit 9 typically supplies 600 V DC to the battery pack 4.

According to the embodiment, a pre-charge contactor 12 is connected in parallel with the positive main contactor 10. Also, a pre-charge resistor 13 is connected in series with the pre-charge contactor 12. All the contactors 10, 11, 12 are connected to the control unit 5 and can be controlled by the control unit 5 in a manner which will be described in more detail below.

Figure 2:
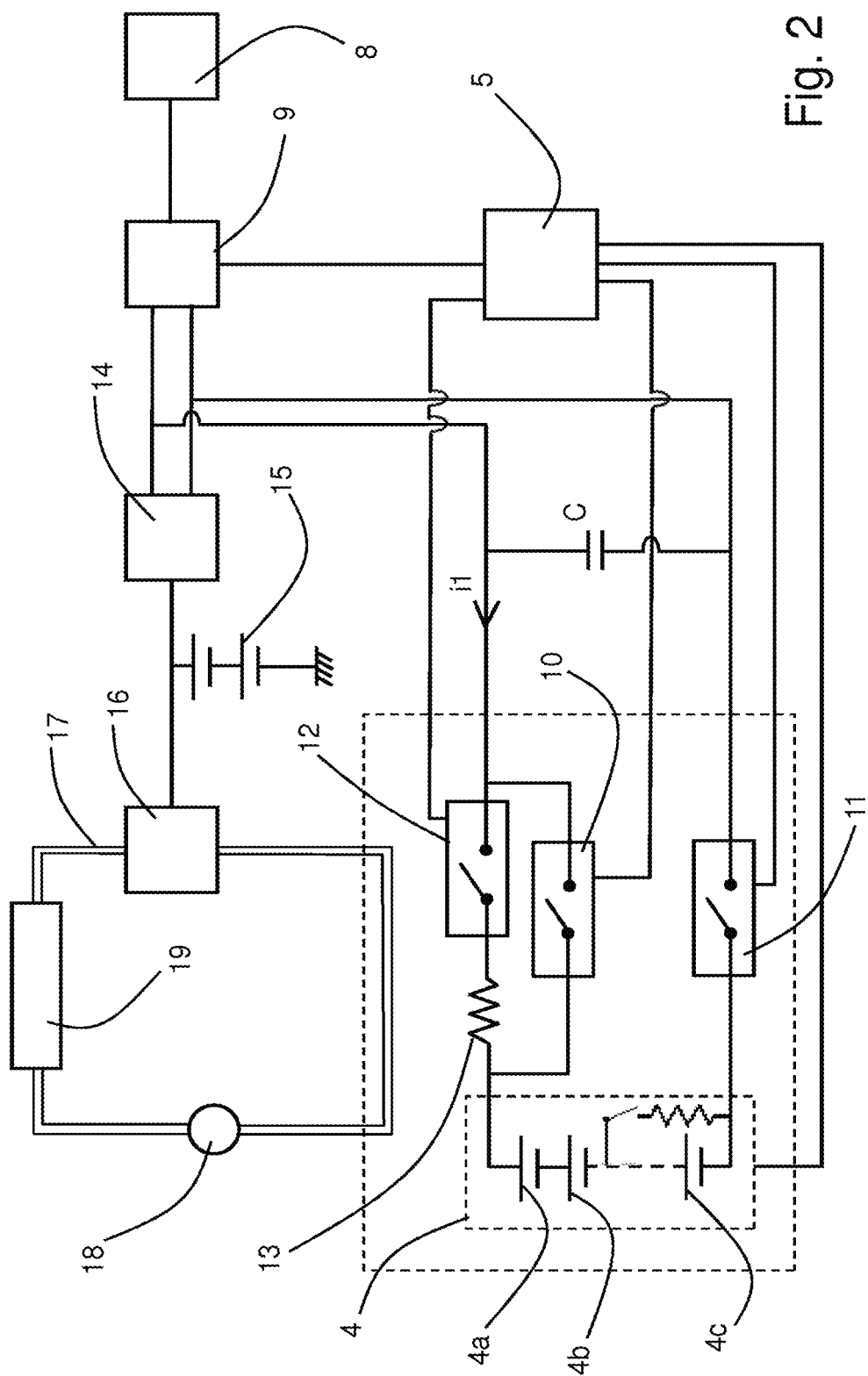
FIG. 2 is a schematic view of an arrangement for balancing a battery pack according to an embodiment of the invention.

As shown in FIG. 2, the control unit 5 is connected to the charging unit 9 and to the battery pack 4, and is arranged for initiating a balancing process for the battery pack 4 depending on the distribution of energy between the battery cells 4a, 4b, 4c. This will be described below.

In order to carry out a cell balancing process, the control unit 5 is configured for monitoring the status of the battery pack 7a, i.e. to monitor the status of each battery cell 4a, 4b, 4c. For this reason, the control unit 5 may be configured with sensor units (not shown) for measuring the voltage of each battery cell and for transmitting information related to measured voltage values to the control unit 5.

Furthermore, the charging unit 9 is connected to a DC/DC converter 14, which is configured for supplying electric power to certain low voltage components, such as for example a second battery unit 15 for powering components such as air condition systems, heating devices and lighting units. A further example of a component to which the DC/DC converter 14 is connected is an electrical healer 16 which is configured for heating a liquid which flows in a liquid circuit 17. The liquid is pumped through the circuit 17 by means of a pump 18. The liquid circuit 17 is arranged close to the battery pack 4 so as to be used for a temperature control of said battery pack 4. According to the embodiment, the liquid circuit 17 also comprises a cooling package 19 such as a radiator or a heat exchanger. The liquid is transported in the liquid circuit 17 to the battery pack 4 and then back to the pump 18. In this manner, a temperature control of the battery pack 4 can be implemented.

Consequently, the on-board charging unit 9 supplies electric energy both in the form of a traction voltage which is supplied to the battery pack 4 and also a low voltage, via the DC/DC converter 14, to certain electric components of the vehicle such as the heater 16, the pump 18 and the low voltage battery 15.

As mentioned initially, this disclosure relates to a method and system for balancing the battery pack 4. It is previously known that the battery cells of a battery pack may differ over time as regards their state of charge (SOC). This is due to the fact that as the battery cells are charged and discharged, the electric energy is distributed in an uneven manner between the cells. This means that, from time to time, there will be a need for a cell balancing process wherein the differences regarding the state of charge for the battery cells are evened out.

A known way of balancing battery cells is to generate energy by conducting current through a resistor which is coupled in parallel to each battery cell. This can be done for a number of battery cells for which the state of charge is relatively high. To be able to carry out this cell balancing, the cell voltage needs to be kept at a relatively high energy level in the cell. This is due to the inherent properties of the measured cell voltage and the corresponding state of charge parameters, which have a clear detectable relation to each other only when the cell voltage is relatively high.

Furthermore, it is known to use a sensor arrangement which is configured for measuring one or more parameters indicating the operation of the battery, for example in the form of a voltage sensor for each battery cell in order to measure the cell terminal voltage for each cell. Such a sensor arrangement could then be used for detecting various parameters related to the operation of the battery. This means that a cell balancing process can be initiated when the control unit 5 has detected that a given number of battery cells has a cell voltage and/or state of charge which differs from predetermined threshold values.

A problem which may occur during the above-mentioned cell balancing process is that the cell voltage for the battery cells in question may drop considerably during said procedure. This means also that there may be a loss of charge from the battery pack 4 during the cell balancing, i.e. the energy from the battery cells may be drained to a certain extent. This means that the cell voltage may drop so much that it will be outside the part of the voltage versus state of charge curve in which there is a clear and defined relationship between the voltage and state of charge.

For the above-mentioned reasons, and for solving the problem mentioned above, the invention is based on the concept that it comprises a process of controlling a relatively small current i1, as indicated in FIG. 2, which is supplied to the battery pack 4 during the balancing procedure. The current i1 is supplied by means of the charging unit 9. This means that the loss of charge through the bleeder resistor of each battery cell in question can be limited. Also, the battery cell voltage drop will be limited during the cell balancing, which is an advantage.

In summary, according to the embodiment, the control unit 5 is adapted to control the charging unit 9 to feed a relatively low current i1 to the battery pack 4 during the cell balancing. The supply of this relatively low current i1 is suitably terminated when the cell balancing process is terminated.

According to an embodiment, the current i1 is controlled by feeding it through the resistor 13 during the cell balancing process. More precisely, since the magnitude of the resistance of the resistor 13 is known, the current i1 can be calculated by measuring the voltage. The resistor 13 can be a so-called pre-charge resistor which forms part of the battery pack 4 and is configured for a pre-charge function in which an inrush current from the charging unit 9 can be limited when the battery pack 4 is connected to the charging unit 9. In this manner, the resistor 13 can be used to pre-charge a system capacitance, symbolically indicated by means of the letter C in FIG. 2. This is needed to equalize the voltage between the charging unit 9 and the battery pack 4 for a reduction of an inrush current when the contactors 10, 11 are closed. However, the invention is not limited to arrangements comprising a pre-charge function but can be used also without such a function. In such case, the current i1 is fed through a resistor which is not involved in any pre-charge function. In case a pre-charge function is used, the relatively small current i1 is fed through the pre-charger resistor 13 for a certain time period, after which the pre-charge resistor 13 is disconnected by opening the pre-charge contactor 12. Next, the positive main contactor 10 is closed.

The relatively small current i1 is fed through the resistor 13 during a phase when the battery cells cannot receive any substantial amount of charge. Subsequently, when both the positive main contactor 10 and the negative main contactor 11 have been closed, the charging unit 9 can be used for normal charging of the battery pack 4.

The relatively low current i1 can be controlled since the battery pack voltage V applied by the charging unit 9 is known. Also, the resistance of the resistor 13 is known. According to an embodiment, the resistance is of the magnitude 100 ohms. This means that the current through the resistor 13 can be accurately controlled during the cell balancing process by detecting the voltage drop over the resistor 13 and calculating the current. Alternatively, a current sensor (not shown) for detecting the battery current can be used in order to control the relatively low current i1.

According to an embodiment, the relatively low current i1 should preferably be approximately 100 mA. In any case, it should not exceed 200-300 mA.

The actual magnitude of this current is chosen so as to compensate for the amount of discharge in the battery cells in question so that there is generally no voltage drop in the battery cells. Also, the control of the current through the resistor 13 is used until the charge and discharge ability of the battery pack 4 have reached above a predetermined limit. At this stage, an accurate control of the current is no longer needed and the positive main contactor 10 can be closed. Optionally, the magnitude can also be controlled to prevent damage to the battery cells in a relatively cold battery pack. By feeding a current through the resistor 13, the battery current is limited to a low level which cannot cause damage.

Finally, the current i1 can be kept at a relatively low level during the cell balancing process even if voltage variations in the electric system occur, for example in a situation where a load is connected or disconnected.

Figure 3:
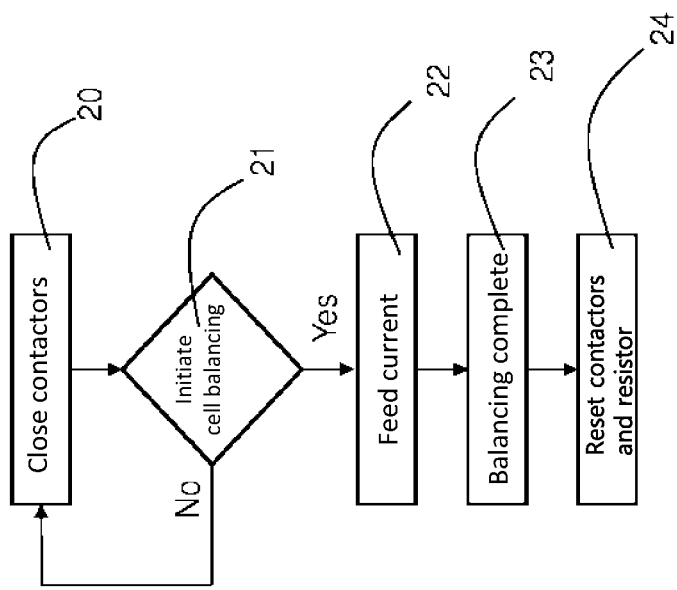
FIG. 3 is a flow chart showing the manner in which the invention is implemented.

FIG. 3 is a schematic flow chart illustrating the operation of the invention. Initially, the control unit 5 is configured for charging the battery pack 4 by having the positive main contactor 10 and the negative main contactor closed 11 (step 20 as shown in FIG. 3). The control unit 5 is also configured for detecting whether to initiate a cell balancing process (step 21). This is done by detecting whether there are battery cells having a voltage level or a state of charge (SOC) which deviates from certain predetermined threshold values. It is known that battery packs degrade over time, and by diagnosing certain battery parameters such as the cell terminal voltage, the cell capacity and the cell state of charge, an indication of the state of operation of the battery pack 4 can be obtained.

If a cell balancing process is to be initiated, the charging unit 9 feeds the above-mentioned relatively low current i1 to the battery pack (step 22). According to an embodiment, the current is controlled so as to compensate for a loss of charge which occurs in the battery pack 4 during the cell balancing process. Preferably, the current i1 is fed through the resistor 13, by closing the pre-charge contactor 12 and opening the positive main contactor 10. The current i1 can be supplied to the battery pack by gradually increasing the current feed.

The control unit 5 is arranged to continuously measure whether the cell balancing process is considered to be finished, which is when the voltage over the battery cells involved in the cell balancing have reached a predefined voltage range. At this stage, the balancing is considered to be completed (step 23). According to the embodiment, the feeding of the current i1 then also terminated. Next, the pre-charge resistor 13 is disconnected, i.e. the pre-charge contactor 12 is opened, and the positive main contactor 10 is again closed (step 24).

It is to be understood that the present invention is not limited to the embodiments described above and illustrated in the drawings; rather, the skilled person will recognize that many changes and modifications may be made within the scope of the appended claims.

For example, even though this disclosure refers to a vehicle 1 in the form of a bus, the invention can generally be implemented in virtually any type of vehicle which is operated by means of at least an electric machine. Such vehicles include cars, buses, trams, transport vehicles, construction equipment and trains.

The invention claimed is:

1. A method for balancing a battery pack comprising a plurality of battery cells connected in series and providing an output battery voltage, the method comprises the steps of: initiating a process of balancing said battery pack depending on the distribution of energy between said battery cells; feeding a relatively low current through a pre-charge resistor and a pre-charge contactor being arranged in series with the battery pack by closing the pre-charge contactor and opening a main contactor being connected to the battery pack in parallel with the pre-charge contactor, and feeding said relatively low current to said battery pack during said balancing; measuring the voltage across the pre-charge resistor, thereby obtaining a value of the current; and controlling the magnitude of the relatively low current so as to be adapted to compensate for a loss of electric charge in the battery cells during the cell balancing is performed such that a battery cell voltage drop of said battery cells is limited during the cell balancing; selectively connecting each battery cell via with a resistor coupled in parallel by means of a controllable switch during the cell balancing process, terminating the step of feeding said relatively low current when said balancing process is terminated by opening the pre-charge contactor and closing the main contactor.

2. The method according to claim 1, further comprising: feeding the current during a phase when the charge and discharge ability of the battery pack is below a predetermined limit.

3. The method according to claim 1, further comprising: feeding the current through the resistor for limiting an inrush current when the battery pack is connected to a charging unit.

4. The method according to claim 1, further comprising: controlling the current to a magnitude which does not exceed approximate 200-300 mA.

5. A computer comprising a computer program for performing the steps of claim 1 when the program is run on the computer.

6. A non-transitory computer readable medium carrying a computer program for performing the steps of claim 1 when the program product is run on a computer.

7. A control unit for controlling a balancing process in a battery pack and being configured to perform the steps of the method according to claim 1.

8. A system for controlling a current being fed to a battery pack comprising a plurality of battery cells connected in series and providing an output battery voltage, each battery cell associated with a resistor coupled in parallel, the system being wherein it comprises a control unit which is adapted for feeding a relatively low current through a pre-charge resistor and a pre-charge contactor, which are arranged in series with the battery pack, and for measuring the voltage across the pre-charge resistor, thereby obtaining a value of the current, and wherein the control unit is further configured for initiating a process of balancing said battery pack depending on the distribution of energy between said battery cells, for closing the pre-charge contactor and opening a main contactor being connected to the battery pack in parallel with the pre-charge contactor, and feeding said relatively low current to said battery pack during said balancing, and for opening the pre-charge contactor and closing the main contactor for terminating the step of feeding said relatively low current when said balancing process is terminated, each battery cell being arranged to be selectively connected by means of a controllable switch during the cell balancing process, wherein the control unit is adapted for controlling the magnitude of the current to compensate for a loss of electric charge in the battery cells during the cell balancing is performed such that a battery cell voltage drop of said battery cells is limited during the cell balancing.

9. The system according to claim 8, wherein the control unit is configured for feeding the current during a time period when the charge and discharge ability of the battery pack is below a predetermined limit.

10. A vehicle comprising the system according to claim 8.

11. The system according to claim 8, further comprising a charging unit for charging the battery pack and for feeding the relatively low current to the battery pack.

12. The system according to claim 11, wherein the current is fed through the resistor for limiting an inrush current when the battery pack is connected to the charging unit.

13. The system according to claim 11, wherein the battery pack further comprises a main contractor and that the control unit is configured for closing the main contractor and disconnecting the resistor after feeding the current.

\* \* \* \* \*